US012450397B2

(12) United States Patent
Sreepalli et al.

(10) Patent No.: US 12,450,397 B2
(45) Date of Patent: Oct. 21, 2025

(54) DISTRIBUTED COMPUTING SYSTEM FOR SECURE DOCUMENT ROUTING

(71) Applicant: Bank of America Corporation, Charlotte, NC (US)

(72) Inventors: Srilaxmi Sreepalli, Hyderabad (IN); Rajapandian C, Kovilambakkam (IN); Sujatha Balaji, Kovilambakkam (IN)

(73) Assignee: Bank of America Corporation, Charlotte, NC (US)

( * ) Notice: Subject to any disclaimer, the term of this patent is extended or adjusted under 35 U.S.C. 154(b) by 155 days.

(21) Appl. No.: 17/988,025

(22) Filed: Nov. 16, 2022

(65) Prior Publication Data

US 2024/0160790 A1   May 16, 2024

(51) Int. Cl.
*H04L 9/08* (2006.01)
*G06F 21/60* (2013.01)
*G06F 21/64* (2013.01)
*G06K 19/06* (2006.01)
*H04L 9/32* (2006.01)

(52) U.S. Cl.
CPC ............ *G06F 21/64* (2013.01); *G06F 21/602* (2013.01); *G06K 19/06037* (2013.01); *H04L 9/0825* (2013.01); *H04L 9/3228* (2013.01); *G06F 2221/2107* (2013.01)

(58) Field of Classification Search
CPC ................. G06F 21/64; G06F 21/602; G06F 2221/2107; H04L 9/0825; H04L 9/3228
See application file for complete search history.

(56) References Cited

U.S. PATENT DOCUMENTS

| 8,910,274 | B2 | 12/2014 | Sanders |
| 9,594,993 | B2 | 3/2017 | Picard et al. |
| 9,736,149 | B2 | 8/2017 | Bettenburg et al. |
| 2017/0324711 | A1* | 11/2017 | Feeney ................. H04L 9/3247 |
| 2019/0095835 | A1* | 3/2019 | Jarvis ..................... G06Q 10/06 |
| 2019/0347433 | A1* | 11/2019 | Chakravorty ............. H04L 9/30 |
| 2020/0035339 | A1* | 1/2020 | Eevani .................. H04L 9/0847 |
| 2020/0258176 | A1 | 8/2020 | Gibson et al. |
| 2023/0334163 | A1* | 10/2023 | Stephens ............. G06F 21/6209 |

FOREIGN PATENT DOCUMENTS

CA     3002977 A1   5/2017

* cited by examiner

*Primary Examiner* — Viet D Vu
(74) *Attorney, Agent, or Firm* — Banner & Witcoff, Ltd.

(57) ABSTRACT

Arrangements for providing secure document distribution are provided. In some aspects, a request to distribute a file may be received. The request may include identification of the file being distributed, as well as identification of a recipient. The identified file may be encrypted and stored in a distributed hash table. In some examples, a file reference key associated with the encrypted file may be generated and stored in a distributed ledger. A secure QR code based on the file reference key may be generated and transmitted to a recipient computing device. In some arrangements, an indication of a scan of the secure QR code may be received. Responsive to receiving the indication of the scan, the file reference key may be retrieved and a decrypted file of the encrypted file may be generated and provided to the recipient for viewing and/or downloading.

16 Claims, 12 Drawing Sheets

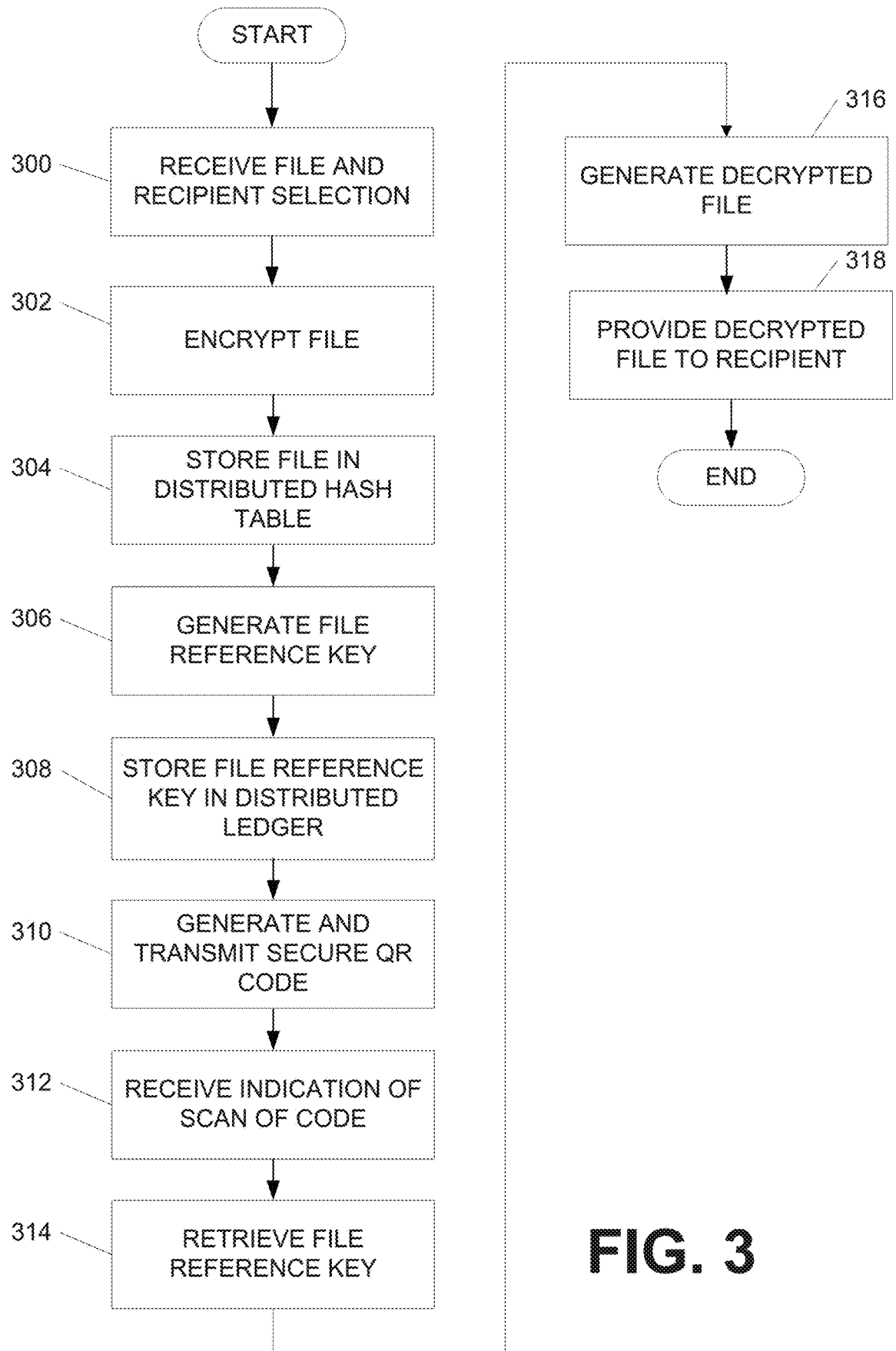

US 12,450,397 B2

DISTRIBUTED COMPUTING SYSTEM FOR SECURE DOCUMENT ROUTING

BACKGROUND

Aspects of the disclosure relate to electrical computers, systems, and devices for providing secure document routing.

Securely sharing confidential information is an important aspect of many businesses. Conventional file sharing arrangements may face security issues and may be vulnerable to data tampering. Further, file size can be limiting in transferring confidential data in a secure manner. Accordingly, it may be advantageous to provide secure document routing that may be used with very large files.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with securely transmitting or distributing large data files or documents.

In some aspects, a request to transmit or distribute a document may be received. The request may include identification of the document or file(s) being distributed, as well as identification of a recipient and/or recipient computing device associated with the file distribution. In some examples, the identified file or document(s) may be encrypted and stored in a distributed hash table.

In some examples, a file reference key associated with the encrypted file may be generated and stored in a distributed ledger. A secure quick response (QR) code based on the file reference key may be generated and transmitted to a recipient computing device.

In some arrangements, an indication of a scan of the secure QR code may be received. Responsive to receiving the indication of the scan of the secure QR code, the file reference key may be retrieved and a decrypted file of the encrypted file may be generated and provided to the recipient. In some examples, providing the decrypted file to the recipient may include providing the file for viewing and/or downloading.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 illustrates an illustrative method for implementing secure document distribution functions according to one or more aspects described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, many business transfer large files or documents between both internal and external users throughout the course of business. For instance, a financial institution may both receive (e.g., from a customer requesting a loan) and send (e.g., to one or more analysts) various documents needed to obtain a loan (e.g., mortgage, auto loan, or the like). These documents may be very large in size and may include confidential information that may require secure distribution of the documents. Further, because of the file size, the files or documents may be broken into multiple files or documents and transmitted in multiple transfers. This can make the transfer process inefficient, more prone to unauthorized users, and may degrade the quality of the data.

Accordingly, aspects described herein provide for secure document distribution, regardless of size of the document (e.g., documents of any size may be distributed without creating multiple files, sending in multiple transfers, or the like). In some examples, a sending user may identify one or more files or documents for distribution and may identify a recipient of the documents. In response, the identified documents may be encrypted and stored in a distributed hash table. In some examples, a file reference key associated with the encrypted file may be generated and stored in a distributed ledger.

A secure quick response (QR) code may be generated based on the file reference key. The secure QR code may be transmitted to the recipient. In some examples, a one-time passcode (OTP) may also be transmitted to the recipient. The recipient may be validated upon receipt of the OTP and the secure QR code may be activated.

Upon detecting a scan of the QR code, the file reference key may be retrieved and a decrypted file of the encrypted file may be generated. The decrypted file may then be provided to the recipient for viewing and/or downloading.

These and various other arrangements will be discussed more fully below.

Figure 1A:
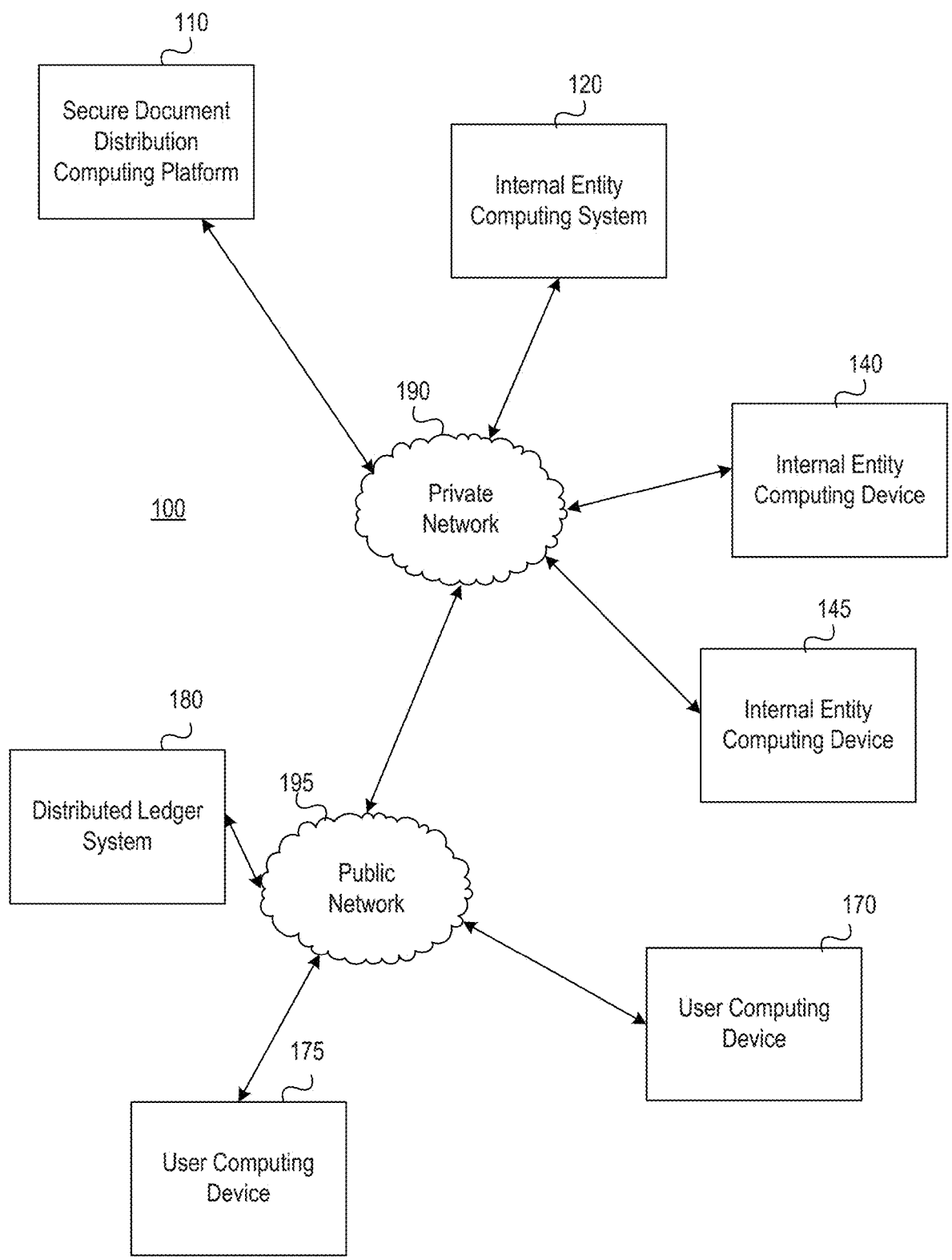
FIGS. 1A and 1B depict an illustrative computing environment for implementing secure document distribution functions in accordance with one or more aspects described herein.
Figure 1B:
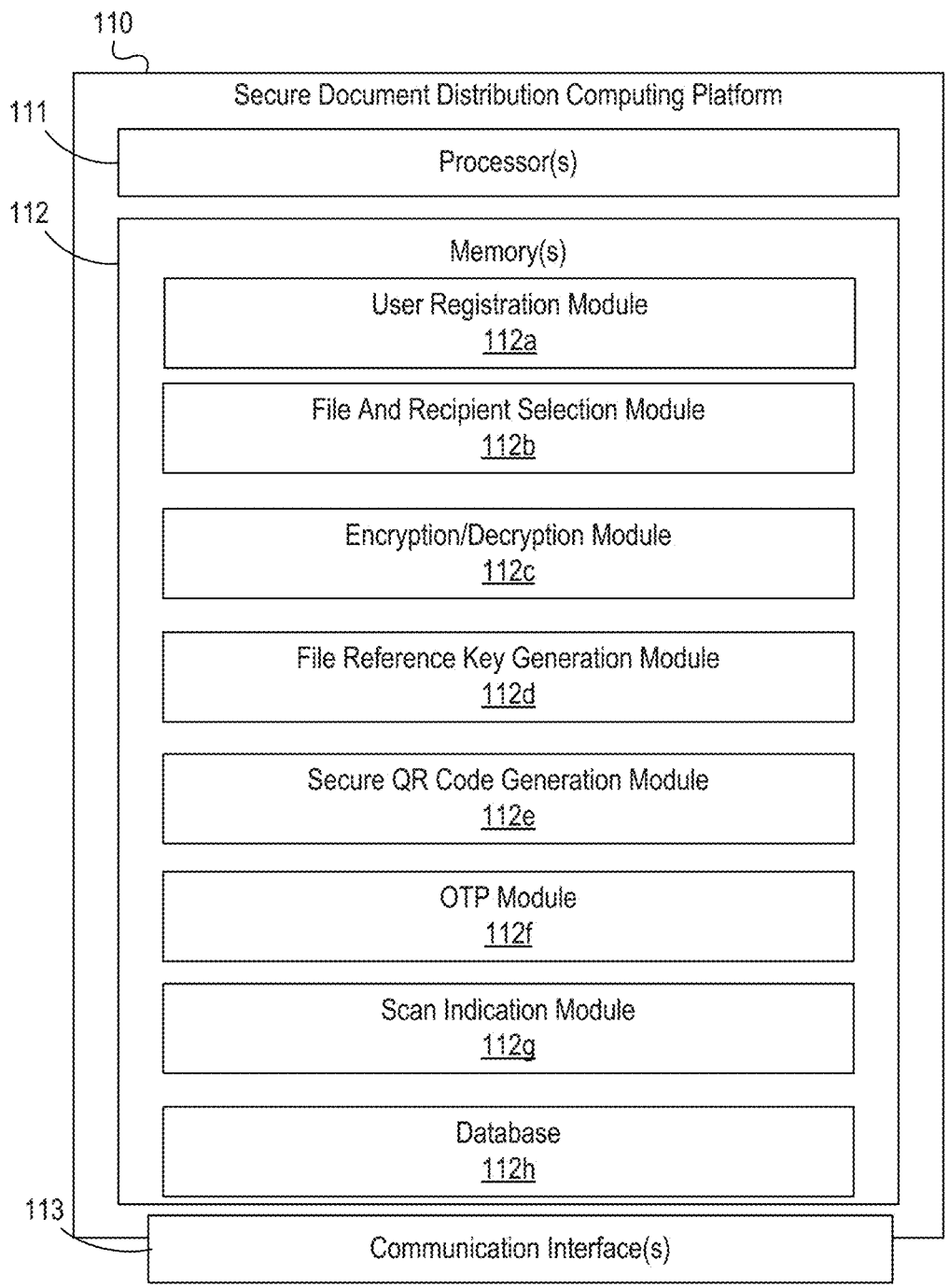

Aspects described herein may be implemented using one or more computing devices operating in a computing environment. For instance, FIGS. 1A-1B depict an illustrative computing environment for implementing secure document distribution functions in accordance with one or more aspects described herein. Referring to FIG. 1A, computing environment 100 may include one or more computing devices and/or other computing systems. For example, computing environment 100 may include secure document distribution computing platform 110, internal entity computing system 120, internal entity computing device 140, internal entity computing device 145, distributed ledger system 180, user computing device 170, and/or user computing device 175. Although one internal entity computing system 120, two internal entity computing devices 140, 145, one distributed ledger system 180, and two user computing devices 170, 175 are shown, any number of systems or devices may be used without departing from the invention.

Secure document distribution computing platform 110 may be configured to perform intelligent, dynamic, and efficient secure document distribution using secure QR codes to facilitate transfer of confidential files. In some examples, secure document distribution computing platform 110 may receive identification of one or more files for distribution. Further, secure document distribution computing platform 110 may receive one or more recipients to whom the one or more files are being distributed.

In some examples, secure document distribution computing platform 110 may encrypt the selected one or more files. In some arrangements, the files may be hashed using Rivest-Shamir-Adleman (RSA) algorithm, a secure hashing algorithm (SHA), or the like. The encrypted file(s) may be stored in a distributed hash table. In some arrangements, a private key of a public/private key paid may be used to encrypt the document. A reference key associated with the encrypted file may be generated and stored as a data block in a distributed ledger system 180. In some examples, the distributed ledger may act as a file identifier within a peer-to-peer (P2P) network.

Secure document distribution computing platform 110 may generate a secure QR code based on the generated reference key. In some examples, a one-time passcode (OTP) may be generated and send to the recipient (e.g., with the secure QR code, in a separate communication, or the like). In some arrangements, the secure QR code will be activated upon receiving the OTP from the recipient device.

Once the OTP is validated and an indication of a scan of the secure QR code is received, secure document distribution computing platform 110 may retrieve the reference key from the distributed ledger system 180 and may decrypt the file. The decrypted file may then be made available to the recipient (e.g., to view, download, or the like).

Internal entity computing system 120 may be or include one or more computing devices or systems (e.g., servers, server blades, or the like) including one or more computer components (e.g., processors, memory, or the like) that may store one or more confidential files that are being distributed to a recipient. For instance, in some examples, files for secure distribution may be selected from files stored at internal entity computing system 120.

Internal entity computing device 140 and/or internal entity computing device 145 may be or include computing devices (e.g., laptop computing devices, desktop computing devices, tablet computing devices, mobile computing devices, and the like) operated by an enterprise organization associate (e.g., an employee of an enterprise organization). In some examples, internal entity computing device 140 may correspond to a device requesting distribution of one or more files and internal entity computing device 145 may correspond to a device associated with a recipient of the files.

User computing device 170 and/or user computing device 175 may be or include computing devices (e.g., laptop computing devices, desktop computing devices, tablet computing devices, mobile computing devices, and the like) operated by a user external to the enterprise organization. In some examples, user computing device 170 may correspond to a user requesting distribution of a file, while user computing device 175 may correspond to a recipient of the files.

In some examples, a requesting user may be internal to the enterprise organization (e.g., internal entity computing device 140 or internal entity computing device 145), while the recipient may be external to the enterprise organization (e.g., user computing device 170 or user computing device 175). Additionally or alternatively, a requesting user may be external to the enterprise organization (e.g., user computing device 170 or user computing device 175) and the recipient may be internal to the enterprise organization (e.g., internal entity computing device 140 or internal entity computing device 145).

Distributed ledger system 180 may be or include one or more computing devices or systems (e.g., servers, server blades, or the like) including one or more computer components (e.g., processors, memory, or the like) hosting a distributed ledger (e.g., blockchain, Holochain, or the like). The distributed ledger system 180 may be a public blockchain (e.g., as shown in FIG. 1A) or may be a private blockchain hosted by or associated with the enterprise organization.

As mentioned above, computing environment 100 also may include one or more networks, which may interconnect one or more of secure document distribution computing platform 110, internal entity computing system 120, internal entity computing device 140, internal entity computing device 145, distributed ledger system 180, user computing device 170 and/or user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, secure document distribution computing platform 110, internal entity computing system 120, internal entity computing device 140, and/or internal entity computing device 145, may be associated with an enterprise organization (e.g., a financial institution), and private network 190 may be associated with and/or operated by the organization, and may include one or more networks (e.g., LANs, WANs, virtual private networks (VPNs), or the like) that interconnect secure document distribution computing platform 110, internal entity computing system 120, internal entity computing device 140, and/or internal entity computing device 145, and one or more other computing devices and/or computer systems that are used by, operated by, and/or otherwise associated with the organization. Public network 195 may connect private network 190 and/or one or more computing devices connected thereto (e.g., secure document distribution computing platform 110, internal entity computing system 120, internal entity computing device 140, internal entity computing device 145) with one or more networks and/or computing devices that are not associated with the organization. For example, distributed ledger system 180, user computing device 170 and/or user computing device 175, might not be associated with an organization that operates private network 190 (e.g., because distributed ledger system 180, user computing device 170 and/or user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect distributed ledger system 180, user computing device 170 and/or user computing device 175 to private network 190 and/or one or more computing devices connected thereto (e.g., secure document distribution computing platform 110, internal entity computing system 120, internal entity computing device 140, and/or internal entity computing device 145).

Referring to FIG. 1B, secure document distribution computing platform 110 may include one or more processors 111, memory 112, and communication interface 113. A data bus may interconnect processor(s) 111, memory 112, and communication interface 113. Communication interface 113 may be a network interface configured to support communication between secure document distribution computing platform 110 and one or more networks (e.g., private network 190, public network 195, or the like). Memory 112 may include one or more program modules having instructions that when executed by processor(s) 111 cause secure document distribution computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of secure document distribution computing platform 110 and/or by different computing devices that may form and/or otherwise make up secure document distribution computing platform 110.

For example, memory 112 may have, store and/or include user registration module 112a. User registration module 112a may store instructions and/or data that may cause or enable secure document distribution computing platform 110 to receive user registration data. For instance, one or more users may register with the system and may provide user identifying information, and the like. In some examples, users may register with the system and may be senders of documents and/or recipients of documents. In some examples, users must be registered with the system to send and/or receive documents via the arrangements described herein.

Secure document distribution computing platform 110 may further have, store and/or include file and recipient selection module 112b. File and recipient selection module 112b may store instructions and/or data that may cause or enable the secure document distribution computing platform 110 to receive a request to distribute one or more files to one or more recipients. The request may include identification of the one or more files, identification of the one or more recipients, and the like. In some examples, file and recipient selection module 112b may retrieve the identified file(s) from, for instance, internal entity computing system 120.

Secure document distribution computing platform 110 may further have, store, and/or include encryption/decryption module 112c. Encryption/decryption module 112c may store instructions and/or data that may cause or enable the secure document distribution computing platform 110 to generate a public private key pair associated with a user, a request to distribute a document, or the like. In some examples, encryption/decryption module 112c may further store instructions and/or data that may cause or enable secure document distribution computing platform 110 to encrypt (e.g., using a public key of the public/private key pair) and/or hash a document for distribution (e.g., using RSA or SHA algorithm), send the encrypted document for storage in a distributed hash table, or the like. Encryption/ decryption module 112c may further decrypt documents upon receiving an indication of a scan of a secure QR code from, for instance, a recipient (e.g., a validated recipient).

Secure document distribution computing platform 110 may further have, store and/or include file reference key generation module 112d. File reference key generation module 112d may store instructions and/or data that may cause or enable the secure document distribution computing platform 110 to generate a file reference key based on the encrypted file. The file reference key may be stored as a data block in a distributed ledger on a distributed ledger system 180 (e.g., may be transmitted to the distribution ledger system 180 for storage).

Secure document distribution computing platform 110 may further have, store and/or include secure QR code generation module 112e. Secure QR code generation module 112e may store instructions and/or data that may cause or enable secure document distribution computing platform 110 to generate a secure QR code based on the generated file reference key. The secure QR code may then be transmitted to a recipient of the document or file being distributed and used to retrieve the document.

Secure document distribution computing platform 110 may further have, store and/or include one-time passcode (OTP) module 112f. OTP module 112f may store instructions and/or data that may cause or enable secure document distribution computing platform 110 to generate an OTP to validate a recipient of a document. The OTP may be transmitted to the recipient (e.g., via email, SMS, or the like to a number or address provided at registration). The OTP may then be received from the recipient and, if the received OTP matches the sent OTP, the recipient may be validated, the secure QR code activated and the recipient may be enabled to retrieve the document or file being distributed.

Secure document distribution computing platform 110 may further have, store and/or include scan indication module 112g. Scan indication module 112g may store instructions and/or data that may cause or enable the secure document distribution computing platform 110 to receive an indication of a scan of the secure QR code (e.g., the recipient may scan the secure QR code as a request to retrieve the document or file) and retrieve the file reference key in order to decrypt the document and provide access to the recipient.

Secure document distribution computing platform 110 may further have, store and/or include database 112h. Database 112h may store data associated with previous document distribution, registered users, and the like.

FIGS. 2A-2H depict one example illustrative event sequence for implementing secure document distribution functions in accordance with one or more aspects described herein. The events shown in the illustrative event sequence are merely one example sequence and additional events may be added, or events may be omitted, without departing from the invention. Further, one or more processes discussed with respect to FIGS. 2A-2H may be performed in real-time or near real-time.

Figure 2A:
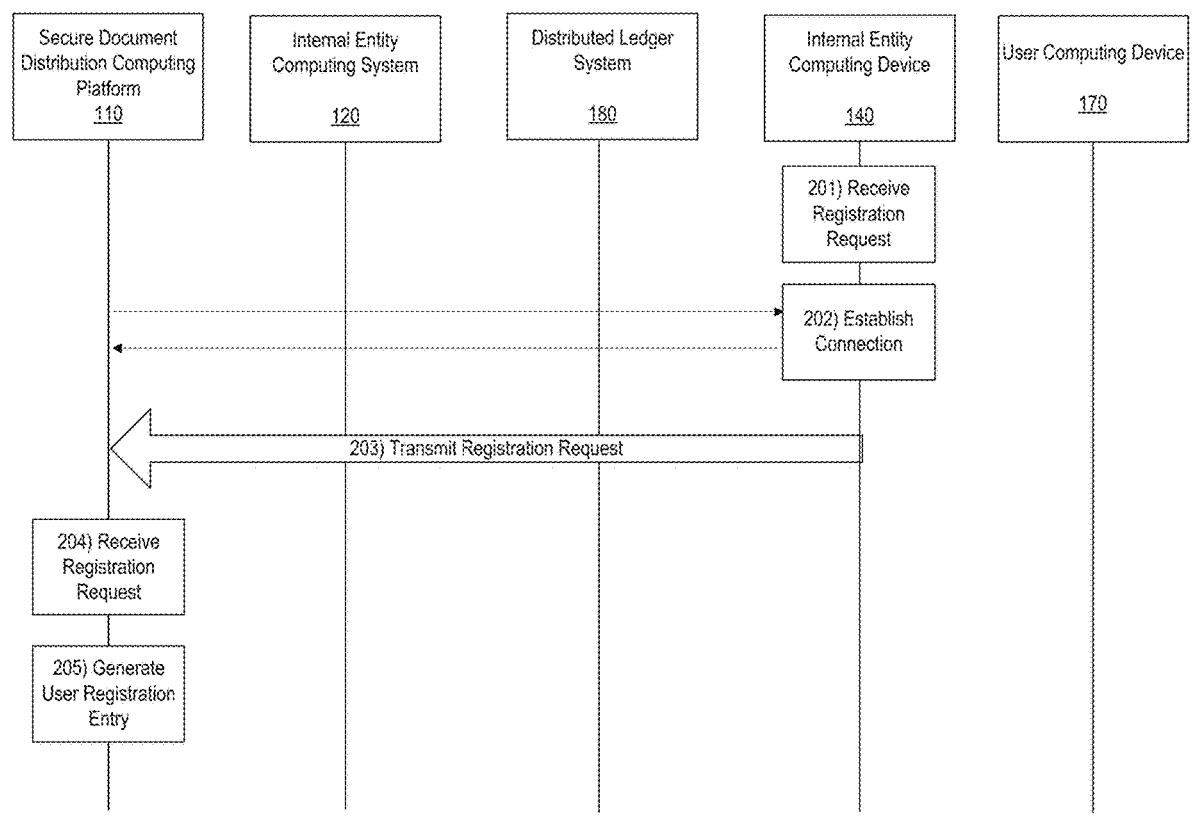
FIGS. 2A-2H depict an illustrative event sequence for implementing secure document distribution functions in accordance with one or more aspects described herein.

With reference to FIG. 2A, at step 201, a registration request may be received by, for instance, internal entity computing device 140. For instance, user input may be received requesting registration with the secure document distribution system. In some examples, the registration request may include information associated with a user associated with internal entity computing device 140, and the like.

At step 202, internal entity computing device 140 may connect to secure document distribution computing platform 110. For instance, a first wireless connection may be established between internal entity computing device 140 and secure document distribution computing platform 110. Upon establishing the first wireless connection, a communication session may be initiated between internal entity computing device 140 and secure document distribution computing platform 110.

At step 203, internal entity computing device 140 may transmit the registration request to the secure document distribution computing platform 110. For instance, the registration request may be transmitted during the communication session initiated upon establishing the first wireless connection. At step 204, the secure document distribution computing platform 110 may receive the registration request.

At step 205, secure document distribution computing platform 110 may generate a user registration entry for a user associated with internal entity computing device 140. In some examples, generating the user registration entry for the user may include generating a public/private key pair that may be used to encrypt, decrypt, access, and the like, documents.

Figure 2B:
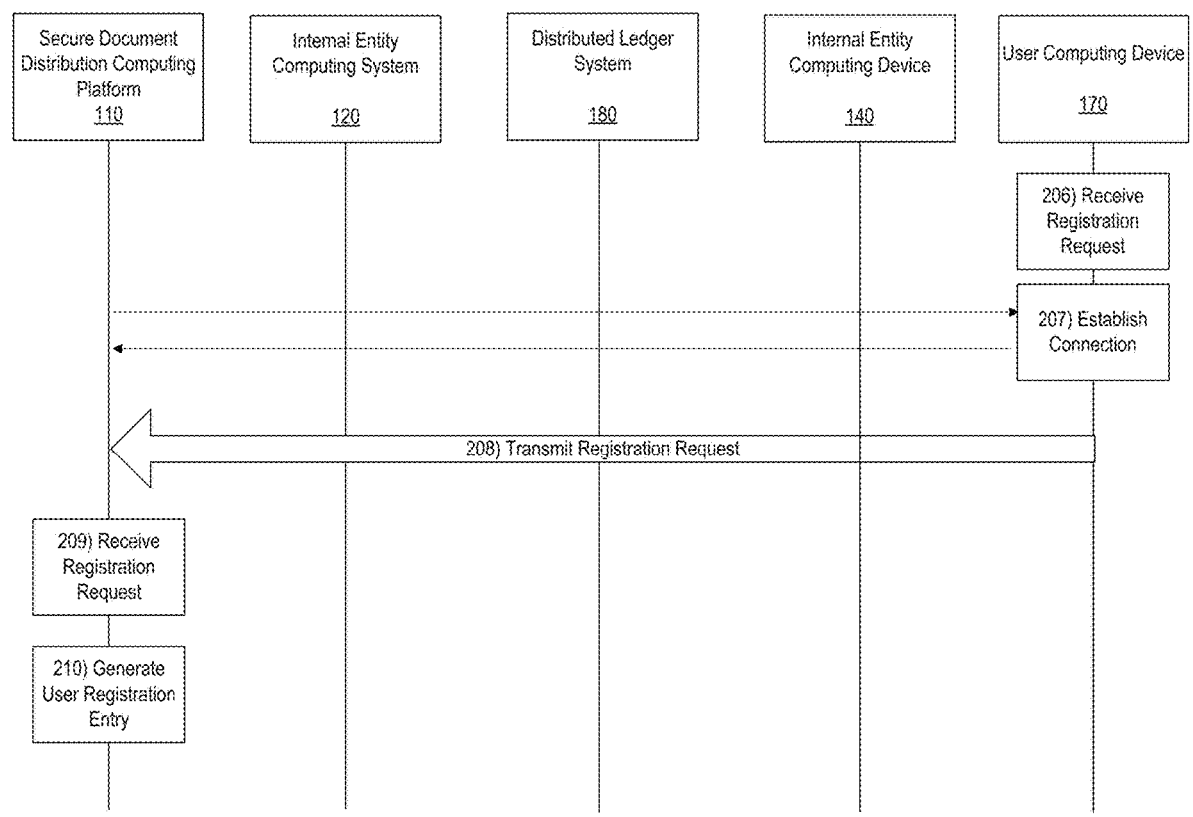

With reference to FIG. 2B, at step 206, a registration request may be received by, for instance, user computing device 170. For instance, user input may be received requesting registration with the secure document distribution system. In some examples, the registration request may include information associated with a user associated with user computing device 170, and the like.

At step 207, user computing device 170 may connect to secure document distribution computing platform 110. For instance, a second wireless connection may be established between user computing device 170 and secure document distribution computing platform 110. Upon establishing the second wireless connection, a communication session may be initiated between user computing device 170 and secure document distribution computing platform 110.

At step 208, user computing device 170 may transmit the registration request to the secure document distribution computing platform 110. For instance, the registration request may be transmitted during the communication session initiated upon establishing the second wireless connection. At step 209, the secure document distribution computing platform 110 may receive the registration request.

At step 210, secure document distribution computing platform 110 may generate a user registration entry for a user associated with user computing device 170. In some examples, generating the user registration entry for the user may include generating a public/private key pair that may be used to encrypt, decrypt, access, and the like, documents.

Figure 2C:
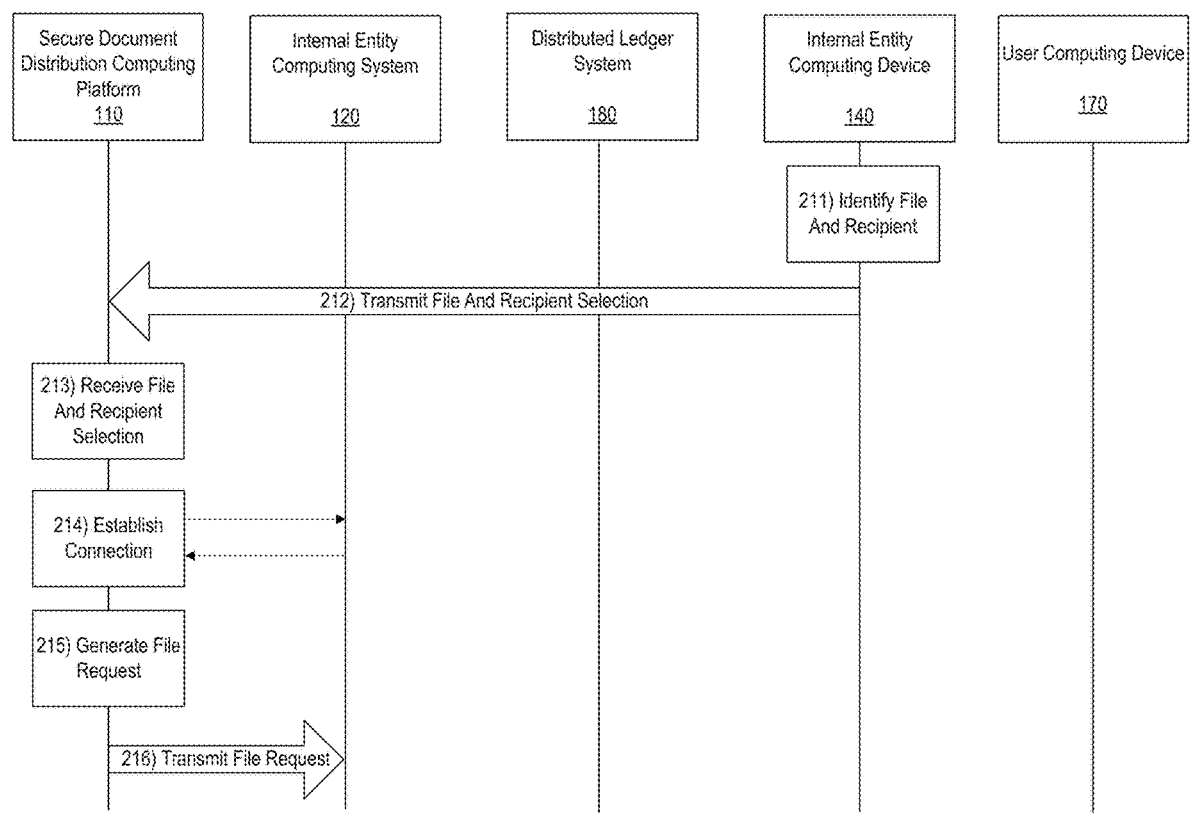

With reference to FIG. 2C, at step 211, after both a sending party and a recipient party are registered with the system, internal entity computing device 140 may receive a request to securely distribute a document. In some examples, the request may include identification of a file and an intended recipient of the file.

Although the arrangements described with respect to FIGS. 2A-2H describe a sender associated with internal entity computing device 140 and a recipient associated with user computing device 170, the sender and recipient may both be internal entity devices, may both be external entity devices or the sender may be external while the recipient is internal, without departing from the invention.

At step 212, internal entity computing device 140 may transmit the identified file and recipient, and request to securely distribute the document. For instance, the identified file, recipient, and request may be transmitted during the communication session initiated upon establishing the first wireless connection. Alternatively, a new connection may be established.

At step 213, secure document distribution computing platform 110 may receive the identification of the file and recipient.

At step 214, secure document distribution computing platform 110 may connect to internal entity computing system 120. For instance, a third wireless connection may be established between secure document distribution computing platform 110 and internal entity computing system 120. Upon establishing the third wireless connection, a communication session may be initiated between secure document distribution computing platform 110 and internal entity computing system 120.

At step 215, secure document distribution computing platform 110 may generate a request for the identified file. At step 216, secure document distribution computing platform 110 may transmit the request for the identified file to the internal entity computing system 120. For instance, the request for the identified file may be transmitted during the communication session initiated upon establishing the third wireless connection.

Figure 2D:
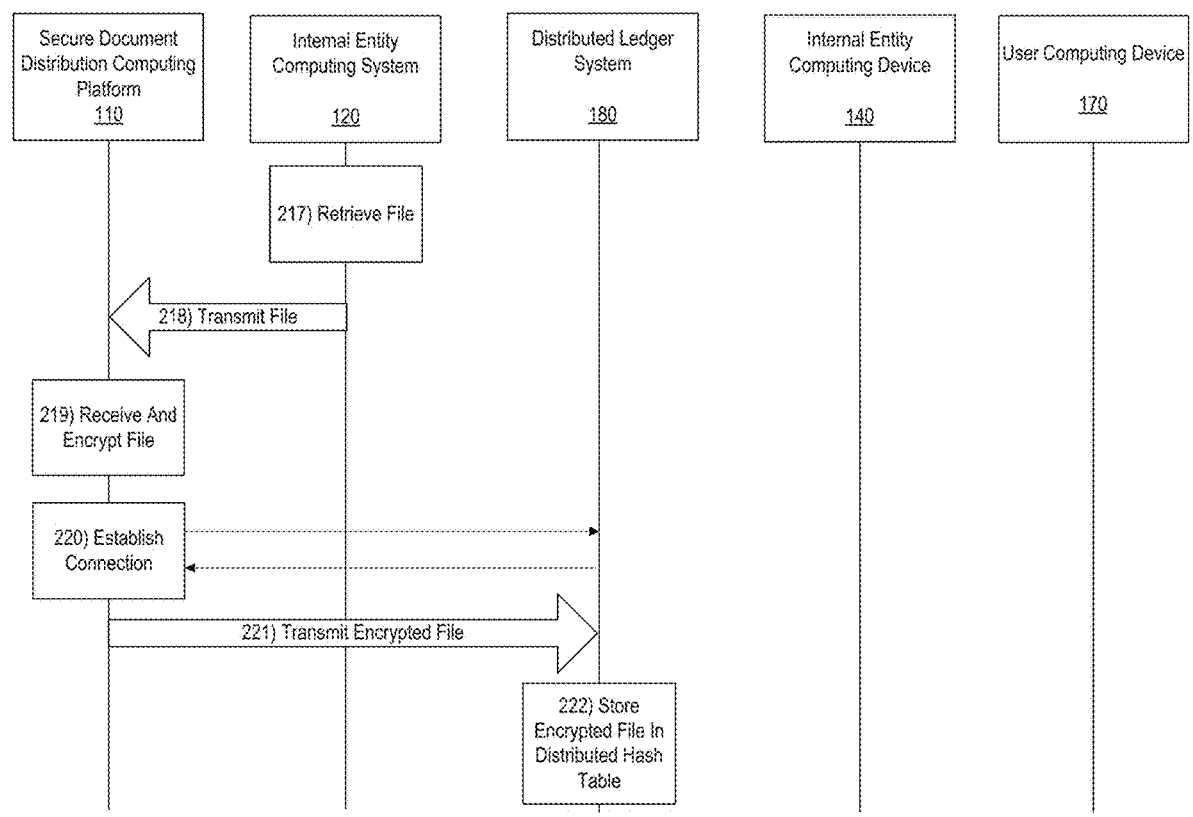

With reference to FIG. 2D, at step 217, internal entity computing system 120 may retrieve the identified file. At step 218, internal entity computing system 120 may transmit the identified file to the secure document distribution computing platform 110.

At step 219, secure document distribution computing platform 110 may receive the file from the internal entity computing system 120 and may encrypt and/or hash the file. For instance, secure document distribution computing platform 110 may encrypt the file using, for example, a private key of a public/private key pair, has the file using SHA or RSA algorithm, and the like.

At step 220, secure document distribution computing platform 110 may connect to distributed ledger system 180. For instance, a fourth wireless connection may be established between secure document distribution computing platform 110 and distributed ledger system 180. Upon establishing the fourth wireless connection, a communication session may be initiated between secure document distribution computing platform 110 and distributed ledger system 180.

At step 221, secure document distribution computing platform 110 may transmit the encrypted file to the distributed ledger system 180. At step 222, the distributed ledger system may store the encrypted file in a distributed hash table. For instance, an inter-planetary file system (IPFS) may be used to store portions of the data from the file and a distributed hash table may be used to store and access the data. Accordingly, resiliency may be built into the system. In some examples, the distributed hash table may have a structured key-based routing mechanism relying on public/private key pairs (e.g., as discussed herein as generated for users).

Figure 2E:
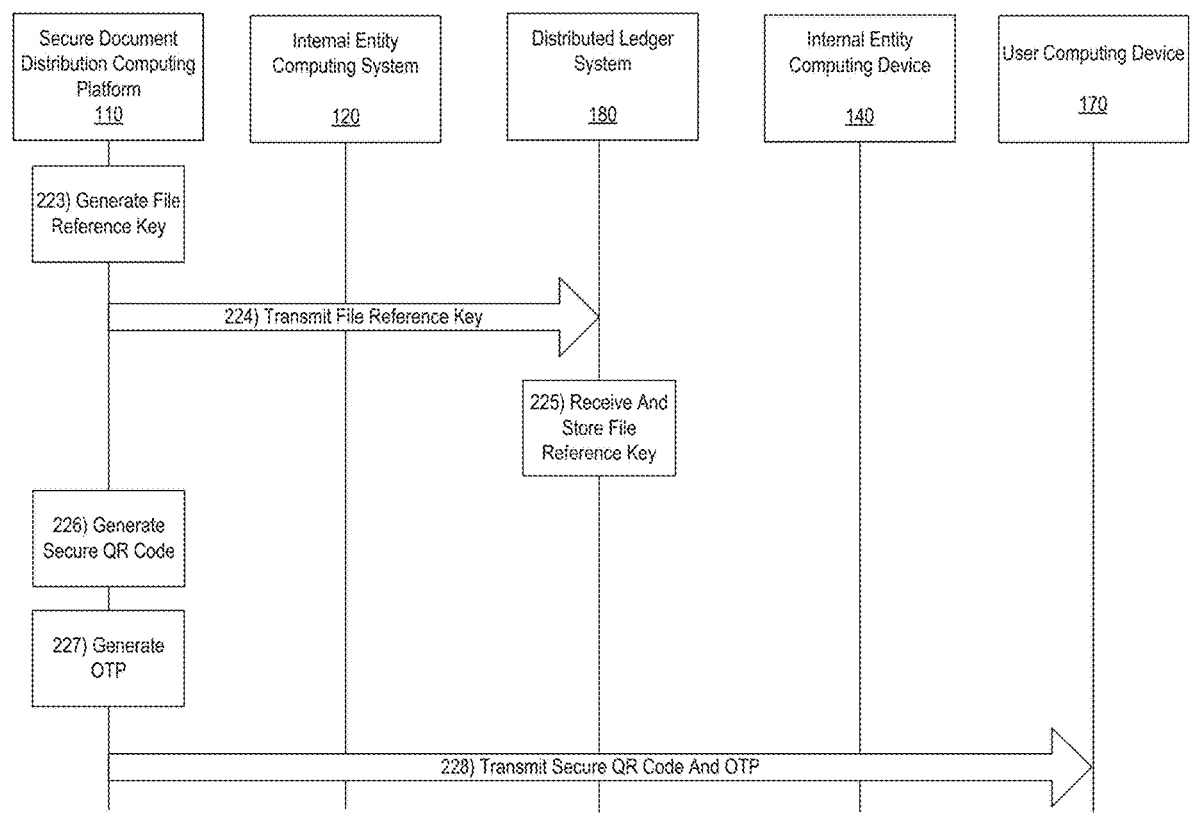

With reference to FIG. 2E, at step 223, a file reference key associated with the encrypted file may be generated. At step 224, the file reference key may be transmitted to the distributed ledger system 180 and, at step 225, the distributed ledger system 180 may receive and store the file reference key. For instance, the file reference key may be stored as a block in a distributed ledger (e.g., blockchain, or the like).

At step 226, secure document distribution computing platform 110 may generate a secure QR code on the file reference key. In some examples, additional validation of a user may be desired. Accordingly, a one-time passcode or other authentication device may be generated at step 227.

At step 228, secure document distribution computing platform 110 may transmit the secure QR code and OTP to the user computing device 170 (e.g., recipient user computing device). In some examples, the secure QR code and OTP may be transmitted in a same transmission (e.g., via email, SMS, or the like). Alternatively, the secure QR code and OTP may be transmitted in separate transmissions (e.g., secure QR code via an application executing on the user computing device and OTP to a pre-registered email address, or the like).

In some examples, transmitting the secure QR code and OTP may include transmitting a public key of a public/private key pair associated with the file, the sending user, or the like. In some arrangements, the public key may be transmitted after validating the OTP sent to the recipient sender.

Figure 2F:
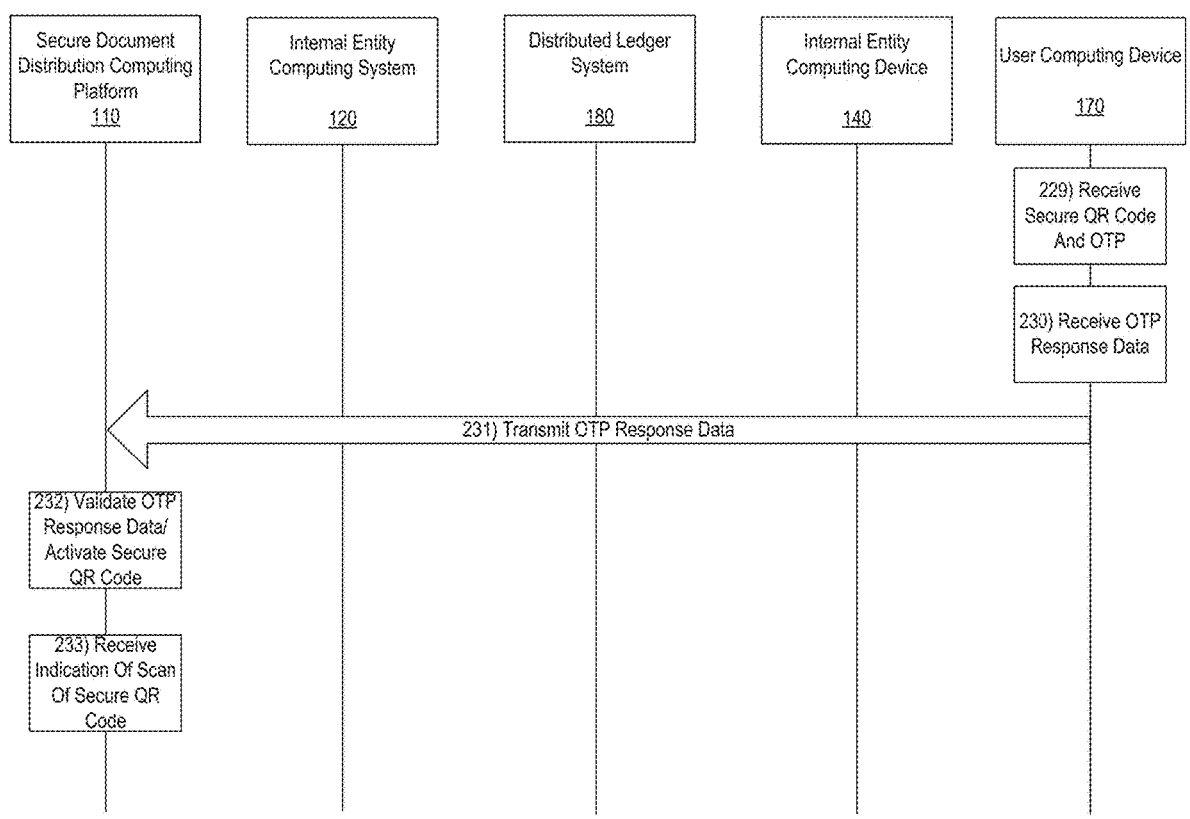

With reference to FIG. 2F, at step 229, user computing device 170 may receive the secure QR code and OTP. At step 230, user computing device 170 may receive OTP response data. For instance, user input providing the OTP received via one channel on the user computing device 170 (e.g., email, SMS, or the like) may be received via another channel (e.g., mobile application, SMS, or the like).

At step 231, user computing device 170 may transmit the OTP response data to the secure document distribution computing platform 110 for comparison to the transmitted OTP in order to validate the recipient. If the OTP response data does not match the OTP transmitted, access to the file will not be provided.

At step 232, if the OTP response data matches the OTP transmitted, the OTP and recipient may be validated and the secure QR code activated. In some examples, activating the QR code may include notifying the recipient of activation.

At step 233, secure document distribution computing platform 110 may receive an indication of a scan of the secure QR code (e.g., a request, by the recipient, to access the file). For instance, the recipient may display the secure QR code on user computing device 170 and a scanning device may scan or read the QR code. This may cause an indication of scanning to be transmitted to the secure document distribution computing platform 110.

Figure 2G:
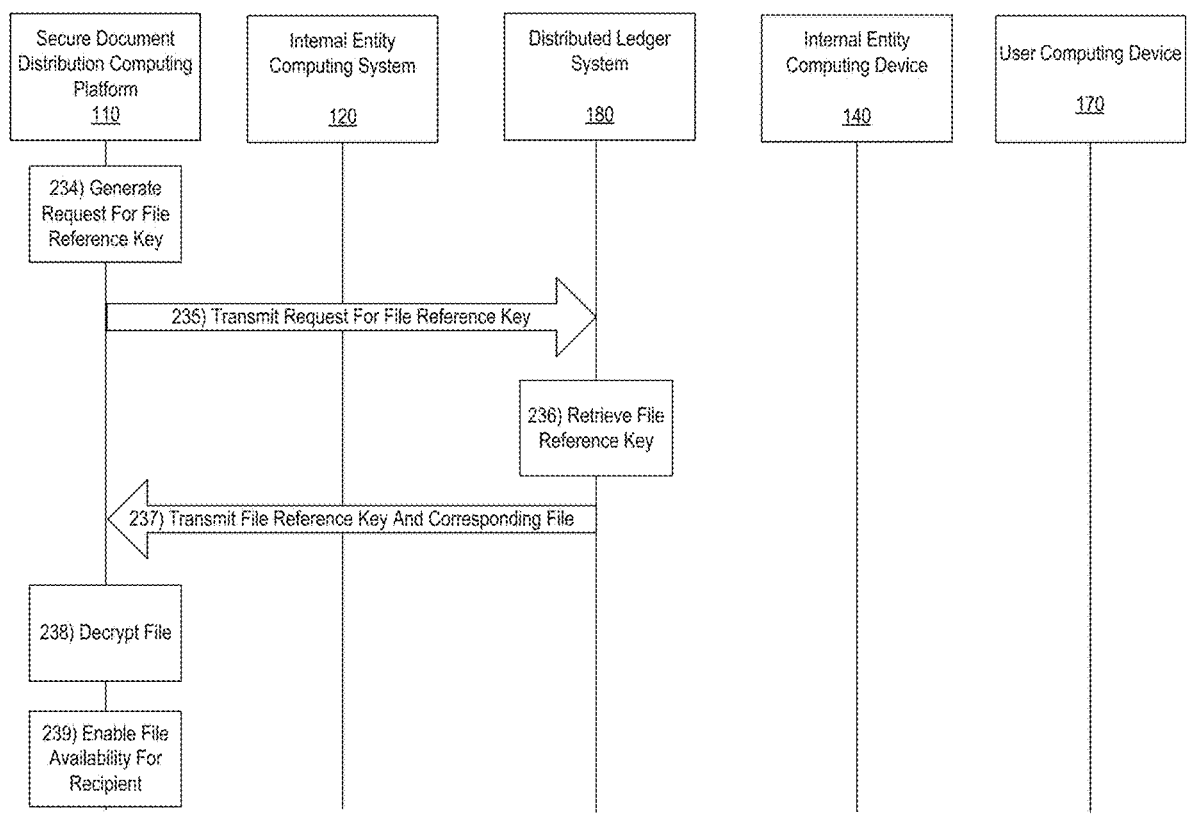
Figure 2H:
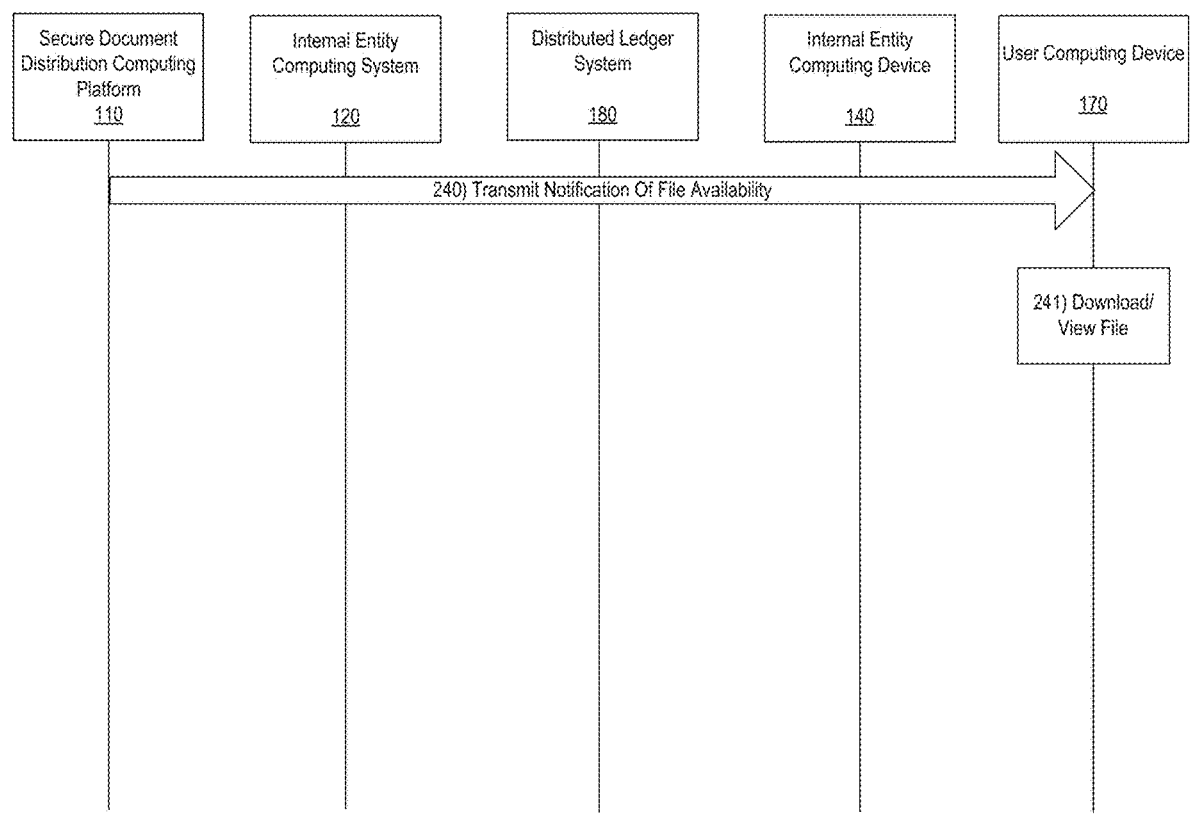

With reference to FIG. 2G, at step 234, in response to receiving the indication of scan, secure document distribution computing platform 110 may generate a request to retrieve the file reference key. At step 235, secure document distribution computing platform 110 may transmit or send the request for the file reference key to the distributed ledger system 180.

At step 236, the distributed ledger system 180 may receive the request and retrieve the file reference key and file. At step 237, the distributed ledger system 180 may send the encrypted file and file reference key to the secure document distribution computing platform 110.

At step 238, secure document distribution computing platform 110 may decrypt the file. In some examples, decrypting the file may include decrypting the file using the public key (e.g., received from the recipient) of the public/private key pair. And, at step 239, secure document distribution computing platform 110 may enable the file for availability by the recipient.

With reference to FIG. 2G, at step 240, secure document distribution computing platform 110 may transmit a notification of availability of the file to the user computing device 170. At step 241, user computing device may access the file (e.g., view the file, download the file, or the like).

FIG. 3 is a flow chart illustrating one example method of implementing secure document distribution functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, secure document distribution computing platform 110 may receive selection of a file to distribute, as well as identification of a recipient of the file (e.g., a name of the recipient, an email address of the recipient, a phone number of the recipient, a unique identifier of the recipient, or the like. In some examples, identifying the recipient may include identifying a computing device of the recipient. Further, in some examples, both the sender and recipient (e.g., and associated computing devices) may be pre-registered with the system to enable use of the secure document distribution system. Although the arrangements describe include distribution of one file to one recipient, more than one file may be selected and/or more than one recipient selected without departing from the invention.

At step 302, the selected file may be encrypted. For instance, the file may be encrypted using SHA or RSA algorithms and the encrypted file may be stored in a distributed hash table at step 304.

At step 306, a file reference key associated with the encrypted file may be generated. At step 308, the file reference key may be stored, for instance, in a distributed ledger system 180. In some examples, storing the file reference key in the distributed ledger may include storing the file reference key as a block in the distributed ledger.

At step 310, a secure QR code may be generated based on the file reference key. The secure QR code may include a secure two-dimensional barcode with high data density. The generated secure QR code may be transmitted to the recipient computing device and may be scanned to retrieve the file reference key and, ultimately, the file being distributed.

At step 312, secure document distribution computing platform 110 may receive an indication of the scan of the secure QR code. For instance, the recipient may access the secure QR code (e.g., via an application, portal, or the like) and may display the QR code for scanning. Scanning the secure QR code may cause transmission of a request to retrieve the associated document and data associated with the file reference key which may be used to retrieve the file. Responsive to receiving the indication of scan, at step 314, the file reference key may be retrieved from the distributed ledger system 180.

At step 316, the file may be retrieved (e.g., based on the file reference key), decrypted and, at step 318, may be provided to the recipient (e.g., to view, download, or the like).

Accordingly, aspects described herein provide secure document distribution for files of any size. By relying on secure QR codes and blockchain to provide access to confidential documents, the system securely provides access to data without limits to file size and while maintaining the data quality.

As discussed herein, aspects associated with the secure document distribution functions described may be provided for users who are registered with the system (e.g., have requested registration, provided identifying and device information, and the like). In some examples, by registering with the system, the users (e.g., senders, recipients, and the like) may access functions described herein through an application or user portal. The portal may provide requests for document distribution, receipt of secure QR codes, display of secure QR codes for scanning, display or download of the document, and the like.

In some aspects, a public/private key paid may be used to validate a sender and recipient. For instance, a sender may provide a private key in requesting to transmit the identified file and may grant access to the corresponding public key for the recipient. The identified file may then be hashed using a hashing algorithm and encrypted using the private key of the user. In some examples, the public key may be transmitted to the recipient user or the recipient user may be granted access to the public key, and received with the request to obtain the document, thereby validating the recipient user.

While aspects described herein are related to providing access to a user, in some examples, access may be provided to multiple users and/or multiple users may be required to approve distribution of a file or document. For instance, a user may request to transmit a document to a recipient user and one or more additional approval users may be notified, and authorization requested, prior to providing the document to the recipient. For instance, a secure QR code (and/or OTP) may be transmitted to multiple approving users and scanning the QR code may cause display of the document and a request for the approving user to approve distribution of the content to the identified recipient. In some examples, documents or files may have an identified category and different approval levels may be required for different categories of document.

While aspects described herein include use of a secure QR code, various other machine readable codes may be used without departing from the invention.

Figure 4:
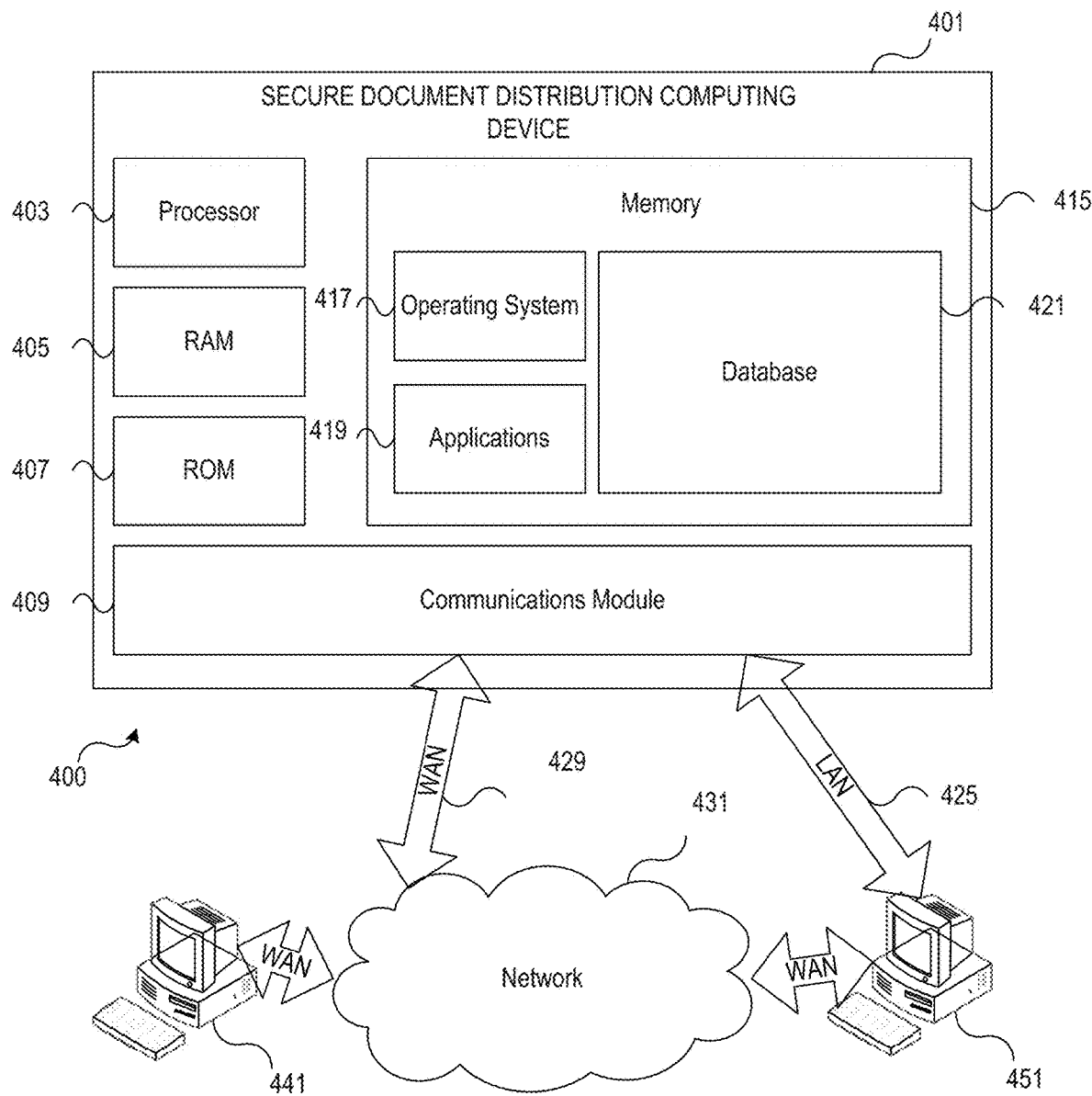
FIG. 4 illustrates one example environment in which various aspects of the disclosure may be implemented in accordance with one or more aspects described herein.

FIG. 4 depicts an illustrative operating environment in which various aspects of the present disclosure may be implemented in accordance with one or more example embodiments. Referring to FIG. 4, computing system environment 400 may be used according to one or more illustrative embodiments. Computing system environment 400 is only one example of a suitable computing environment and is not intended to suggest any limitation as to the scope of use or functionality contained in the disclosure. Computing system environment 400 should not be interpreted as having any dependency or requirement relating to any one or combination of components shown in illustrative computing system environment 400.

Computing system environment 400 may include secure document distribution computing device 401 having processor 403 for controlling overall operation of secure document distribution computing device 401 and its associated components, including Random Access Memory (RAM) 405, Read-Only Memory (ROM) 407, communications module 409, and memory 415. Secure document distribution computing device 401 may include a variety of computer readable media. Computer readable media may be any available media that may be accessed by secure document distribution computing device 401, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by secure document distribution computing device 401.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on secure document distribution computing device 401. Such a processor may execute computer-executable instructions stored on a computer-readable medium.

Software may be stored within memory 415 and/or storage to provide instructions to processor 403 for enabling secure document distribution computing device 401 to perform various functions as discussed herein. For example, memory 415 may store software used by secure document distribution computing device 401, such as operating system 417, application programs 419, and associated database 421. Also, some or all of the computer executable instructions for secure document distribution computing device 401 may be embodied in hardware or firmware. Although not shown, RAM 405 may include one or more applications representing the application data stored in RAM 405 while secure document distribution computing device 401 is on and corresponding software applications (e.g., software tasks) are running on secure document distribution computing device 401.

Communications module 409 may include a microphone, keypad, touch screen, and/or stylus through which a user of secure document distribution computing device 401 may provide input, and may also include one or more of a speaker for providing audio output and a video display device for providing textual, audiovisual and/or graphical output. Computing system environment 400 may also include optical scanners (not shown).

Secure document distribution computing device 401 may operate in a networked environment supporting connections to one or more remote computing devices, such as computing device 441 and 451. Computing devices 441 and 451 may be personal computing devices or servers that include any or all of the elements described above relative to secure document distribution computing device 401.

The network connections depicted in FIG. 4 may include Local Area Network (LAN) 425 and Wide Area Network (WAN) 429, as well as other networks. When used in a LAN networking environment, secure document distribution computing device 401 may be connected to LAN 425 through a network interface or adapter in communications module 409. When used in a WAN networking environment, secure document distribution computing device 401 may include a modem in communications module 409 or other means for establishing communications over WAN 429, such as network 431 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
   receive, from a computing device of a sender, a request for registration;
   responsive to receiving the request for registration, generate a public/private key pair;
   receive, from the computing device of the sender, a request to transmit at least one file to a recipient, wherein the request includes selection of the at least one file to send to the recipient, identification of the recipient of the at least one file, and the private key of the public/private key pair;
   responsive to receiving the request to transmit the at least one file to the recipient, transmit to a plurality of approval users, a notification requesting authorization for the sender to transmit the at least one file to the recipient, wherein the notification includes a first secure quick response (QR) code;
   receive an indication of a scan of the first secure QR code from a computing device of at least one approval user of the plurality of approval users;
   responsive to receiving the indication of the scan of the first secure QR code, cause display of the at least one file on the computing device of the at least one approval user and a request for approval to send the at least one file to the recipient;
   receive, from the computing device of the at least one approval user, approval of the request to send the at least one file to the recipient;
   retrieve, based on the private key and from an internal entity computing system, the selected at least one file;
   encrypt, using the private key of the public/private key pair, the retrieved at least one file, wherein encrypting the retrieved at least one file includes generating a hash of the retrieved at least one file;
   store the encrypted at least one file in a distributed hash table;

generate a file reference key, different from the public/private key pair, associated with the encrypted at least one file;
store the file reference key in a distributed ledger;
generate a second secure QR code based on the file reference key;
transmit, to a computing device of the recipient, the second secure QR code and the public key of the public/private key pair;
receive an indication of a scan of the second secure QR code;
based on the indication of scan of the second secure QR code, retrieve, from the distributed ledger, the file reference key;
generate, based on the retrieved file reference key, a decrypted at least one file from the encrypted at least one file; and
send, to the computing device of the recipient, the decrypted at least one file.

2. The computing platform of claim 1, wherein encrypting the at least one file includes encrypting the at least one file using a secure hashing algorithm.

3. The computing platform of claim 1, further including instructions that, when executed, cause the computing platform to:
generate a one-time passcode;
transmit the one-time passcode to the computing device of the recipient;
receive, from the computing device of the recipient, the one-time passcode;
validate the one-time passcode; and
responsive to validating the one-time passcode, activate the second secure QR code.

4. The computing platform of claim 3, further including instructions that, when executed, cause the computing platform to:
receive, from the sender, registration data;
receive, from the recipient, registration data; and
transmit the one-time passcode to an account of the recipient included in the registration data.

5. The computing platform of claim 4, wherein the one-time passcode is transmitted via one of: email or short message service (SMS).

6. The computing platform of claim 1, wherein storing the file reference key in the distributed ledger includes storing the file reference key as a block in the distributed ledger.

7. A method, comprising:
receive, by a computing platform, the computing platform having at least one processor and memory, and from a computing device of a sender, a request for registration;
responsive to receiving the request for registration, generate a public/private key pair;
receiving, by the at least one processor and from the computing device of the sender, a request to transmit at least one file to a recipient, wherein the request includes selection of the at least one file to send to the recipient, identification of the recipient of the at least one file, and the private key of the public/private key pair;
responsive to receiving the request to transmit the at least one file to the recipient, transmitting, by the at least one processor and to a plurality of approval users, a notification requesting authorization for the sender to transmit the at least one file to the recipient, wherein the notification includes a first secure quick response (QR) code;
receiving, by the at least one processor, an indication of a scan of the first secure QR code from a computing device of at least one approval user of the plurality of approval users;
responsive to receiving the indication of the scan of the first secure QR code, causing, by the at least one processor, display of the at least one file on the computing device of the at least one approval user and a request for approval to send the at least one file to the recipient;
receiving, by the at least one processor and from the computing device of the at least one approval user, approval of the request to send the at least one file to the recipient;
retrieving, from an internal entity computing system and based on the private key, the selected at least one file;
encrypting, by the at least one processor and using the private key of the public/private key pair, the retrieved at least one file, wherein encrypting the retrieved at least one file includes generating a hash of the retrieved at least one file;
storing, by the at least one processor, the encrypted at least one file in a distributed hash table;
generating, by the at least one processor, a file reference key different from the public/private key pair and associated with the encrypted at least one file;
storing, by the at least one processor, the file reference key in a distributed ledger;
generating, by the at least one processor, a second secure QR code based on the file reference key;
transmitting, by the at least one processor and to a computing device of the recipient, the second secure QR code and the public key of the public/private key pair;
receiving, by the at least one processor, an indication of a scan of the second secure QR code;
based on the indication of scan of the second secure QR code, retrieving, by the at least one processor and from the distributed ledger, the file reference key;
generating, by the at least one processor and based on the retrieved file reference key, a decrypted at least one file from the encrypted at least one file; and
sending, by the at least one processor and to the computing device of the recipient, the decrypted at least one file.

8. The method of claim 7, wherein encrypting the at least one file includes encrypting the at least one file using a secure hashing algorithm.

9. The method of claim 7, further including:
generating, by the at least one processor, a one-time passcode;
transmitting, by the at least one processor, the one-time passcode to the computing device of the recipient;
receiving, by the at least one processor and from the computing device of the recipient, the one-time passcode;
validating, by the at least one processor, the one-time passcode; and
responsive to validating the one-time passcode, activating, by the at least one processor, the second secure QR code.

10. The method of claim 9, further including:
receiving, by the at least one processor and from the sender, registration data;
receiving, by the at least one processor and from the recipient, registration data; and transmitting, by the at least one processor, the one-time passcode to an account of the recipient included in the registration data.

11. The method of claim 10, wherein the one-time passcode is transmitted via one of: email or short message service (SMS).

12. The method of claim 7, wherein storing the file reference key in the distributed ledger includes storing the file reference key as a block in the distributed ledger.

13. One or more non-transitory computer-readable media storing instructions that, when executed by a computing platform comprising at least one processor, memory, and a communication interface, cause the computing platform to:
receive, from a computing device of a sender, a request for registration;
responsive to receiving the request for registration, generate a public/private key pair;
receive, from the computing device of the sender, a request to transmit at least one file to a recipient, wherein the request includes selection of the at least one file to send to the recipient, identification of the recipient of the at least one file, and the private key of the public/private key pair;
responsive to receiving the request to transmit the at least one file to the recipient, transmit to a plurality of approval users, a notification requesting authorization for the sender to transmit the at least one file to the recipient, wherein the notification includes a first secure quick response (QR) code;
receive an indication of a scan of the first secure QR code from a computing device of at least one approval user of the plurality of approval users;
responsive to receiving the indication of the scan of the first secure QR code, cause display of the at least one file on the computing device of the at least one approval user and a request for approval to send the at least one file to the recipient;
receive, from the computing device of the at least one approval user, approval of the request to send the at least one file to the recipient;
retrieve, based on the private key and from an internal entity computing system, the selected at least one file;
encrypt, using the private key of the public/private key pair, the retrieved at least one file, wherein encrypting the retrieved at least one file includes generating a hash of the retrieved at least one file;
store the encrypted at least one file in a distributed hash table;
generate a file reference key, different from the public/private key pair, associated with the encrypted at least one file;
store the file reference key in a distributed ledger;
generate a second secure QR code based on the file reference key;
transmit, to a computing device of the recipient, the second secure QR code and ht public key of the public/private key pair;
receive an indication of a scan of the second secure QR code;
based on the indication of scan of the second secure QR code, retrieve, from the distributed ledger, the file reference key;
generate, based on the retrieved file reference key, a decrypted at least one file from the encrypted at least one file; and
send, to the computing device of the recipient, the decrypted at least one file.

14. The one or more non-transitory computer-readable media of claim 13, wherein encrypting the at least one file includes encrypting the at least one file using a secure hashing algorithm.

15. The one or more non-transitory computer-readable media of claim 13, further including instructions that, when executed, cause the computing platform to:
generate a one-time passcode;
transmit the one-time passcode to the computing device of the recipient;
receive, from the computing device of the recipient, the one-time passcode;
validate the one-time passcode; and
responsive to validating the one-time passcode, activate the second secure QR code.

16. The computing platform of claim 1, wherein a number of approval users in the plurality of approval users is based on a category of the at least one file.

* * * * *